US010070336B2

(12) United States Patent
Gunnarsson et al.

(10) Patent No.: US 10,070,336 B2
(45) Date of Patent: Sep. 4, 2018

(54) METHOD FOR COVERAGE DETERMINATION USING PREDEFINED PATHS

(71) Applicant: Telefonaktiebolaget LM Ericsson (publ), Stockholm (SE)

(72) Inventors: Fredrik Gunnarsson, Linköping (SE); Claes Bäckström, Sollentuna (SE); Bo Hagerman, Tyresö (SE); Jimmy O'Meara, Athlone (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 35 days.

(21) Appl. No.: 15/117,525

(22) PCT Filed: Oct. 8, 2014

(86) PCT No.: PCT/SE2014/051180
§ 371 (c)(1),
(2) Date: Aug. 9, 2016

(87) PCT Pub. No.: WO2015/122821
PCT Pub. Date: Aug. 20, 2015

(65) Prior Publication Data
US 2016/0353309 A1 Dec. 1, 2016

Related U.S. Application Data

(60) Provisional application No. 61/938,379, filed on Feb. 11, 2014.

(51) Int. Cl.
*H04W 24/10* (2009.01)
*H04W 16/18* (2009.01)
(Continued)

(52) U.S. Cl.
CPC .......... *H04W 24/10* (2013.01); *H04W 16/18* (2013.01); *H04W 16/20* (2013.01); *H04W 24/02* (2013.01); *H04W 24/08* (2013.01); *H04W 72/085* (2013.01)

(58) Field of Classification Search
CPC ..... H04W 16/20; H04W 24/02; H04W 24/08; H04W 24/10; H04W 72/085; H04W 16/18
See application file for complete search history.

(56) References Cited

U.S. PATENT DOCUMENTS 6,052,583 A   8/2000   Bernardin
6,711,404 B1 * 3/2004   Arpee .................. H04W 16/18
                                                       455/423
(Continued)

FOREIGN PATENT DOCUMENTS

WO   WO 2007072389 A1 *  6/2007   ............. G01C 21/20
WO      2010034495 A1     4/2010
(Continued)

OTHER PUBLICATIONS

Schroder, A.,et al., "User-assisted Coverage and Interference Optimization for Broadband Fremtocells", Integrated Network Management-Workshops, Jun. 1, 2009, pp. 199-204, IEEE.

*Primary Examiner* — Tri H Phan
(74) *Attorney, Agent, or Firm* — Sage Patent Group

(57) ABSTRACT

The present disclosure relates to coverage monitoring and in particular it relates to determining radio coverage, e.g. for small cell deployment in a building. The disclosure relates to methods for coverage determination as well as to corresponding devices and computer programs. According to one aspect, the disclosure proposes a method, performed in a wireless device 10, of determining radio coverage. The method comprises obtaining S1 at least one path along which radio condition measurements are to be performed (Continued)

and performing S2 radio condition measurements along the at least one path. The method further comprises determining S3 position estimates, wherein at least some of the position estimates correspond to the radio condition measurements. The method further comprises determining S4a radio coverage using the radio condition measurements and corresponding position estimates and/or reporting S4b the radio condition measurements and the corresponding position estimates to a radio network node for determination of radio coverage in the radio network node.

18 Claims, 11 Drawing Sheets

(51) Int. Cl.
*H04W 24/02* (2009.01)
*H04W 16/20* (2009.01)
*H04W 24/08* (2009.01)
*H04W 72/08* (2009.01)

(56) References Cited

U.S. PATENT DOCUMENTS

| | | | |
|---|---|---|---|
| 8,498,811 B2* | 7/2013 | Lundquist | G01C 21/005 701/434 |
| 9,386,421 B2* | 7/2016 | Bolon | H04W 4/028 |
| 9,516,513 B2* | 12/2016 | Sægrov | H01Q 3/2605 |
| 9,525,973 B2* | 12/2016 | Racz | H04W 24/00 |
| 9,733,334 B2* | 8/2017 | Serrano Olmedo | G01S 5/02 |
| 9,788,165 B2* | 10/2017 | Bolon | H04W 4/028 |
| 2002/0111772 A1 | 8/2002 | Skidmore et al. | |
| 2004/0267928 A1 | 12/2004 | Petrus | |
| 2005/0073983 A1 | 4/2005 | Diener | |
| 2007/0042799 A1* | 2/2007 | Jubin | H04W 52/04 455/522 |
| 2009/0191878 A1 | 7/2009 | Hedqvist et al. | |
| 2010/0323702 A1 | 12/2010 | Yang et al. | |
| 2011/0105862 A1* | 5/2011 | Gies | A61B 5/0006 600/301 |
| 2011/0201368 A1* | 8/2011 | Faccin | H04B 7/0413 455/507 |
| 2012/0130632 A1* | 5/2012 | Bandyopadhyay | G01C 17/38 701/446 |
| 2012/0203453 A1* | 8/2012 | Lundquist | G01C 21/005 701/434 |
| 2012/0322488 A1* | 12/2012 | Johansson | H04W 16/10 455/513 |
| 2013/0041549 A1* | 2/2013 | Reeve | B62D 15/025 701/28 |
| 2013/0070726 A1 | 3/2013 | Zhang et al. | |
| 2013/0115956 A1* | 5/2013 | Ewert | H04W 48/08 455/437 |
| 2013/0150043 A1 | 6/2013 | Park | |
| 2013/0225229 A1 | 8/2013 | Al-Shalash | |
| 2014/0071856 A1 | 3/2014 | Brisebois et al. | |
| 2014/0087707 A1* | 3/2014 | Gustafsson | H04W 52/0254 455/418 |
| 2014/0099974 A1* | 4/2014 | Chun | H04W 4/043 455/456.3 |
| 2014/0112288 A1 | 4/2014 | Wei | |
| 2015/0168159 A1* | 6/2015 | Chao | G01C 21/30 701/428 |
| 2016/0353302 A1* | 12/2016 | Gunnarsson | H04W 16/20 |
| 2017/0078893 A1 | 3/2017 | Hyslop | |
| 2017/0118213 A1 | 4/2017 | Edge | |
| 2017/0238275 A1* | 8/2017 | De Pasquale | H04W 64/006 370/252 |

FOREIGN PATENT DOCUMENTS

| | | |
|---|---|---|
| WO | 2013062451 A1 | 5/2013 |
| WO | 2015122822 A1 | 8/2015 |

* cited by examiner

METHOD FOR COVERAGE DETERMINATION USING PREDEFINED PATHS

TECHNICAL FIELD

The present disclosure relates to coverage monitoring and in particular it relates to determining radio coverage, for example, for small cell deployment in a building. The disclosure relates to methods for coverage determination as well as to corresponding devices and computer programs.

BACKGROUND

3GPP Long Term Evolution, LTE, is the fourth-generation mobile communication technology standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. The Evolved UMTS Terrestrial Radio Access Network, E-UTRAN, consists of base stations called enhanced NodeBs, which may be abbreviated eNBs or eNodeBs, providing the E-UTRA user plane and control plane protocol terminations towards the UE. The eNBs are interconnected with each other by means of the X2 interface. The eNBs are also connected by means of the S1 interface to the Evolved Packet Core, EPC.

Cellular service providers manage their networks, for example, by splitting cells with multiple base stations or adding additional base stations. Typically small cells, e.g. pico cells, are added within the cells in order to off-load the network and to increase coverage. The impact of these actions has an effect on the coverage provided, and the service provider requires knowledge of the impact on the quality of their network.

Existing localized coverage monitoring is either based on crude network-based positioning of data, or global navigation satellite system, global navigation satellite system, GNSS, enabled handsets providing localized measurements. As an example of network-based monitoring, in current cellular systems, service providers detect coverage holes by monitoring dropped calls, logging customer complaints, or having technicians move through the cellular system measuring signal strength.

Examples of GNSS-based localization include dedicated handsets such as TEMS (TEst Mobile System) investigation by Ascom, which is the industry standard tool for GNSS-enabled drive test. Coverage monitoring by means of GNSS-enabled handsets is available in rural to urban areas, but in such areas small cells are typically not deployed, and it is not practical to analyze macro cell coverage unless a large number of wireless devices are participating in the monitoring. This is potentially possible via standardized efforts like Minimization of Drive Tests, but only wireless devices that have provided user consent will participate in the monitoring, which means that it will take a significant time to monitor the macro cell coverage. Coverage monitoring by means of GNSS-enabled handsets is generally not available indoors or in dense urban regions.

SUMMARY

Small cell deployments typically target rather focused traffic hotspots. If the site where the small cell is deployed is selected well, the benefits from deploying the small cell are significant; if not, the benefits can be negligible. Today there is no convenient way of verifying the small cell coverage after the installation, especially not when the small cell is deployed indoor or in dense urban areas.

An object of the present disclosure is to provide a method for coverage determination, which seeks to mitigate, alleviate, or eliminate one or more of the above-identified deficiencies in the art and disadvantages singly or in any combination.

The disclosure proposes a coverage verification method applicable when GNSS is not applicable or even available. According to some aspects, the method is based on a wireless device, capable of locating itself without GNSS.

According to some aspects, the disclosure proposes a method, performed in a wireless device, of determining radio coverage for at least one small cell base station. The method comprises obtaining at least one path along which radio condition measurements are to be performed and performing radio condition measurements along the at least one path. The method further comprises determining position estimates, wherein at least some of the position estimates correspond to the radio condition measurements. The method further comprises determining radio coverage using the radio condition measurements and corresponding position estimates and/or reporting the radio condition measurements and the corresponding position estimates to a radio network node for determination of radio coverage in the radio network node.

The method provides the advantage of enabling radio coverage when GNSS is not applicable or even available such as for coverage monitoring indoors or in dense urban regions. By using paths, the measurements may be performed in suitable positions, such that desired coverage determination is performed.

According to some aspects, the method of determining radio coverage further comprises providing a graphical representation of the path in the wireless device. Such a visualisation guides the user to the places where measurements are desired.

According to some aspects, the method of determining radio coverage further comprises determining suitable cell deployment using the determined coverage and at least one deployment criteria. According to some aspects, the deployment criteria comprise at least one of: an estimate of the inter-node distance, an estimate of the shortest distance to a window, a signal propagation model or a dominance criterion.

According to some aspects, the method of determining radio coverage further comprises receiving an indication to initiate determination of radio coverage. According to some aspects, the obtaining comprises receiving information defining at least one path, from a network node.

According to some aspects, the position estimates are positioned along at least one predefined path. According to some aspects, the position estimates are made using the at least one predefined path.

According to some aspects, the method of determining radio coverage further comprises visualizing the determined coverage in the wireless device. The visualization of determined coverage in the user enables a user to perceive a need to perform further radio coverage measurements.

According to some aspects, the radio condition measurements comprise at least one of Signal to interference Ratio, Radio Signal Strength, Radio Signal Quality, suitable coding and modulation scheme.

According to some aspects, the disclosure relates to a wireless device comprising means for obtaining at least one path along which radio condition measurements are to be performed, performing radio condition measurements along the at least one path, determining position estimates, wherein at least some of the position estimates correspond to the radio condition measurements, and determining radio coverage using the radio condition measurements and corresponding position estimates or report, using the radio communication interface, the radio condition measurements and the corresponding position estimates to a radio network node for determination of radio coverage in the radio network node. The network further comprises means for performing all the aspects of the method in a network node described above and below.

According to some aspects, the proposed technique relates to a method, performed in a network node in a wireless communications network, of enabling radio coverage determination using at least one wireless device being connected to the wireless communications network. The method comprises sending, to a wireless device, information defining at least one path along which radio condition measurements are to be performed.

According to some aspects, the method of enabling radio coverage determination further comprises receiving radio condition measurements from the wireless device; wherein the radio condition measurements are performed along the at least one path, and determining radio coverage using the radio condition measurements and corresponding position estimates.

According to some aspects, the method of enabling radio coverage determination further comprises receiving position estimates corresponding to the received radio condition measurements.

According to some aspects, the method of enabling radio coverage determination further comprises sending information about the determined radio coverage to the wireless device for providing a graphical representation of the determined coverage in the wireless device.

According to some aspects, the method of enabling radio coverage determination further comprises determining suitable cell deployment using the determined radio coverage and at least one deployment criteria.

According to some aspects the deployment criteria comprises at least one of: an estimate of the inter-node distance, an estimate of the shortest distance to a window, a signal propagation model or a dominance criterion.

According to some aspects, the method of enabling radio coverage determination further comprises sending to a wireless device an indication to initiate determination of radio coverage.

According to another aspect, the disclosure relates to a network node which comprises means for sending, to a wireless device, information defining at least one path along which radio condition measurements are to be performed. The network further comprises means for performing all the aspects of the method in a network node described above and below.

The proposed technique provides a simple and automatic procedure for node coverage validation, planning and tuning. This is particularly important when the cost of the nodes to be deployed is low.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1A:
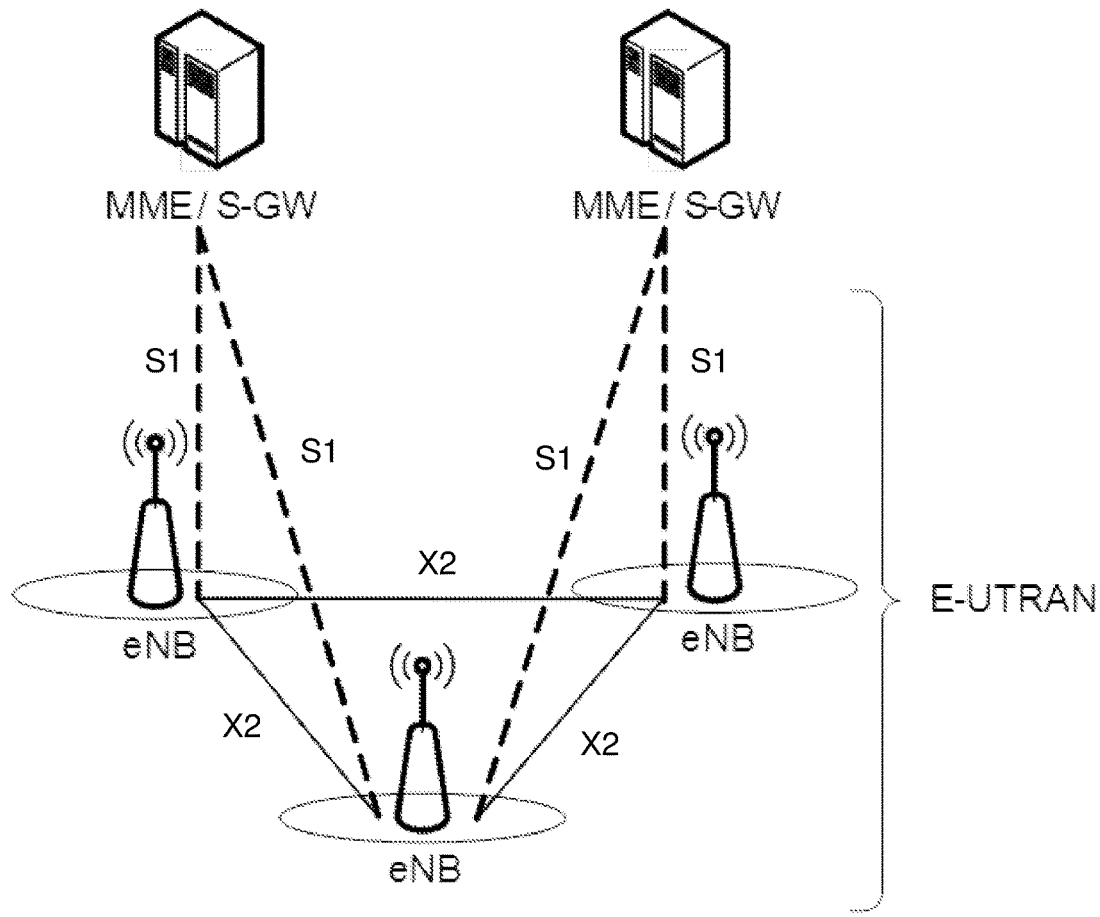
FIG. 1a shows an LTE architecture.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

This disclosure refers to small cells. Small cells are generally defined as low-powered radio access nodes that operate in licensed and unlicensed spectrum that have a range of 10 meters to 1 or 2 kilometers. Small cells encompass femtocells, picocells, and microcells. Compare with mobile macrocells, which may have a range of a few tens of kilometers. In this application a small cell should be interpreted as any cell, which has a size such that it is possible or suitable to determine cell coverage using the proposed methods.

This disclose suggests using a wireless device to determine radio coverage, for example, coverage of a small cell or part of the coverage of a larger cell. The coverage determination is performed by moving the wireless device in the area to be determined. For example, the wireless device is carried around in a building, wherein measurements are performed along predefined paths. A typical implementation would be a software application downloaded in a mobile phone. The software application is running in the application plane and typically utilises a processing unit running other applications.

LTE will be used as the exemplifying radio access technology. However, these embodiments are essentially equally applicable to other radio access technologies as well.

For better understanding of the technique, the architecture of the LTE system is now briefly described referring to FIG. 1a, including radio access nodes, eNBs, and evolved packet core nodes, MME/S-GW. In LTE the S1 interface is the interface between eNodeBs and the Mobility Management Entities, MME, and Serving Gateways, S-GW. Both user data i.e. the application plane, and signaling i.e. the control plane, are supported by the S1 interface. In the user plane this interface will be based on GTP User Data Tunneling, GTP-U, wherein GTP stands for GPRS Tunneling Protocol wherein GPRS is short for General Packet Radio Service.

In LTE the X2 interface has been defined between eNodeBs, working in a meshed way, meaning that all eNodeBs may possibly be linked together. The main purpose of this interface is to minimize packet loss due to user mobility.

Figure 1B:
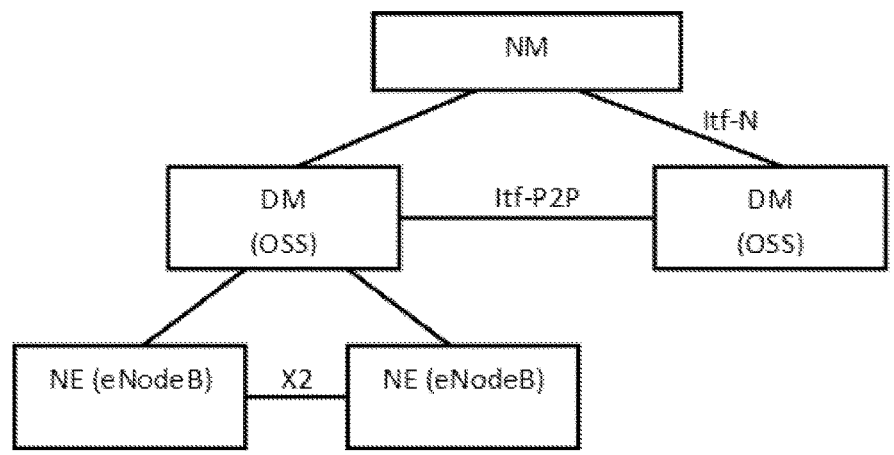
FIG. 1b shows an assumed management system in LTE.
Figure 2:
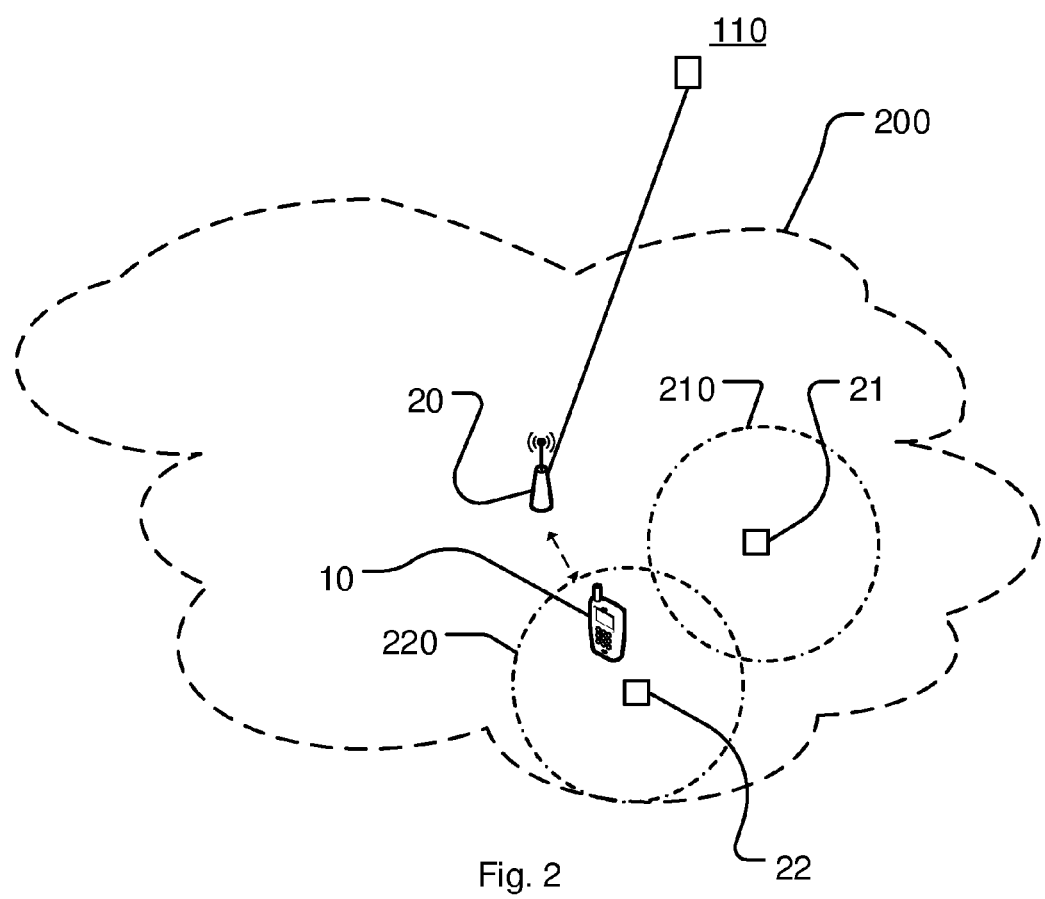
FIG. 2 shows a cell in a cellular network where the proposed methods may be implemented for cell deployment.

The management system assumed in this disclosure is shown in FIG. 1b. The node elements NE, also referred to as eNodeB, are managed by a domain manager, DM, also referred to as the operation and support system, OSS. A DM may further be managed by a network manager, NM. Two NEs are interfaced by X2, whereas the interface between two DMs is referred to as Itf-P2P. The management system may configure the network elements, as well as receive observations associated to features in the network elements. For example, DM observes and configures NEs, while NM observes and configures DM, as well as NE via DM. FIG. 2 illustrates a cellular network where the proposed method may be implemented. The cellular network comprises a macro cell 200 defined by a base station 20. The cellular network further comprises two small cells 210 and 220, defined by base stations 21 and 22, respectively. According to some example embodiments, the proposed technique is used to verify the installation of one of the base stations 21 or 22. According to some of the example embodiments, the proposed technique is used to decide whether further small cells should be deployed. The method uses a wireless device 10. The wireless device 10 is connected to at least one of the base stations, for example, the macro base station 20. The wireless device 10 communicates with a network node 110 via the cellular network. The network node 110 is part of the management system displayed in FIG. 1b. The network node may be a support node for network management terminals. It may also be a more general network management node, supporting performance monitoring, configuration management and/or fault management of the network elements in the network. Part of such tasks may also comprise interaction with terminals, either as a group, for example, all terminals served by a particular cell, or as individuals. The network node will be further described in connection with FIG. 9.

Figure 3:
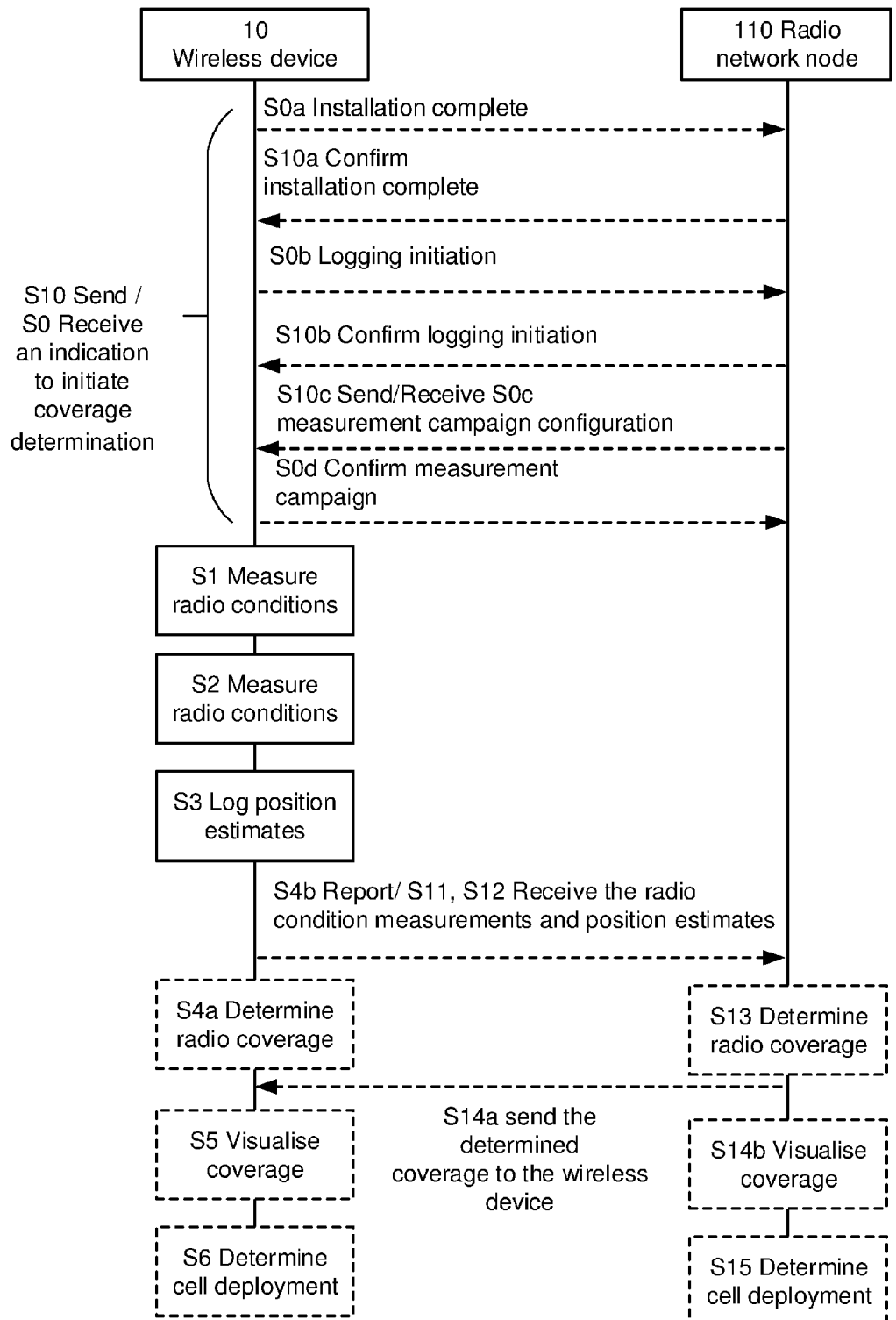
FIG. 3 is a signaling scheme illustrating some of the aspects disclosed herein.
Figure 4:
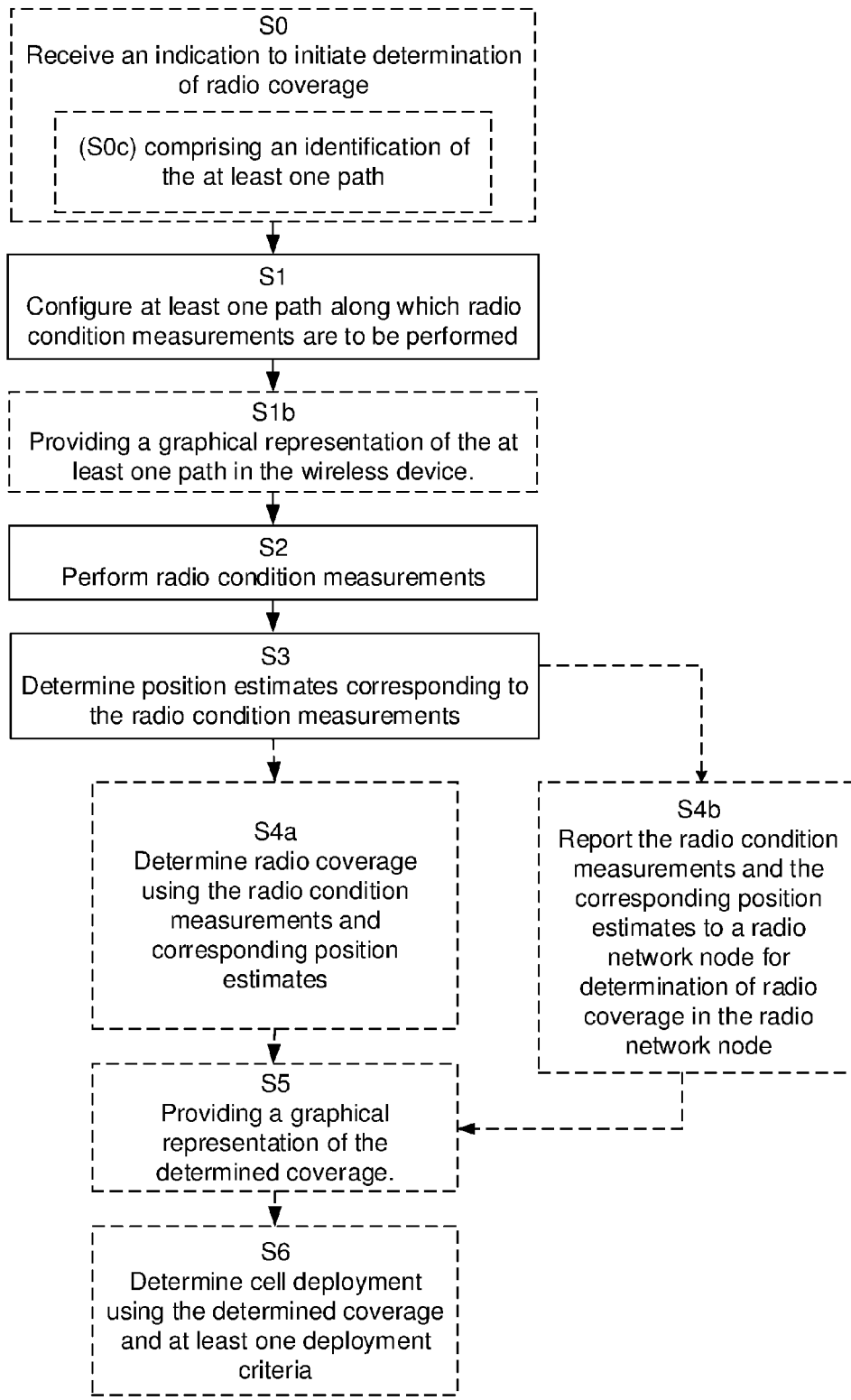
FIG. 4 is a flowchart schematically illustrating embodiments of method steps performed in a wireless device.

FIG. 3 illustrates the signaling between the network and a wireless device 10, when determining radio coverage, according to some of the aspects described herein. FIG. 4 shows the corresponding method steps, performed in a wireless device 10.

It should also be appreciated that FIGS. 3 and 4 comprise some operations which are illustrated with a solid border and some operations which are illustrated with a dashed border. The operations which are comprised in a solid border are associated with a more generic example embodiment or aspect. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination.

Logging Initiation

Logging may be initiated in several ways as will be exemplified in this section. According to some aspects, the wireless device 10, receives, S0, an indication to initiate determination of radio coverage. In this step, a wireless device 10, for example, a wireless device capable of determining a position without GNSS information, receives/issues an indication or request to initiate radio condition measurement and position determination. The indication is associated with a radio network deployment activity. The indication is, for example, an internal indication or a message received from a network.

According to some aspects, the logging is initiated in the wireless device 10, by a signal message exchange with a network node, as illustrated in FIG. 3. Some different possibilities of the step S0 are briefly discussed. For example, the wireless device 10 sends a confirmation message to the network node 110 informing the network that one or more base stations or radio network nodes 21, 22 have been installed, step S0a in FIG. 3. The message may also include one or more hardware identifier(s) identifying the network node hardware 21, 22. Furthermore, the message may also comprise an identifier of a planned site or a planned configuration. The network node 110 may respond with a confirmation message S10a which may further indicate that a radio network node 21, 22 has been activated.

Alternatively, the logging may be initiated by a logging initiation message. Such a message is sent, for example, when the wireless device 10 enters a building, part of a building, an area, etc., wherein the entering may, for example, be disclosed by:

Monitoring an outdoor position. For example, via GNSS or indoor position functionality in the wireless device 10, and determining that the position is in the vicinity of the building, part of building, building entrance, area, etc., wherein, the determining of vicinity may be based on a pre-configured or configurable criterion such as a position determined to be within a region associated to the building, part of building, building entrance, area. One example of a region is a polygon, and another is all positions within a specific distance to a reference position.

An identification of a starting point. For example, by a wireless technology e.g. Radio Frequency Identifier, RFID, Near-Field Communication, NFC, Bluetooth, Wi-Fi, etc. supported by the wireless device 10, a visual tag identified by a visual sensor e.g. a camera, in the wireless device 10. The identification can also be based on vicinity or proximity identification, where the terminal determines that it is within a certain distance from a path starting point. The determination may be based on a comparison of the path starting position and the current terminal position. One such comparison is via a determined distance between the path starting position and the current terminal position, and where measurements are initiated when this distance is below a threshold. The threshold may be pre-configured, configured by a network node or by the user. The vicinity/proximity determination may also be based on a signal strength measurement associated with an entity, for example associated with any of the aforementioned technologies.

The indication of an activity in the wireless device 10. For example, by selecting a task among one or more tasks from a pre-configured or configurable list, or activating a monitoring activity by using some human interaction device associated to the wireless device 10. The indication can also be via a specific excitation of sensors in the wireless device 10 such as a shake, flip or other pre-configured or configurable movement, an audible sound retrieved by a microphone, etc.

Also in the alternative case, the wireless device 10 may signal a message S0b to the network node 110 indicating the initiation of logging. The network node may also respond with a Logging initiation confirm message S10b. The wireless device 10 may alternatively initiate logging without signalling any message to a network node.

According to some aspects, an indication to initiate determination is triggered by a Human Interface Device action in the wireless device 10.

Configuration of Paths

The proposed technique implies that positions for logging position estimates and/or radio condition measurements are restricted to pre-configured or configurable paths. In step S1, at least one path along which radio condition measurements are to be performed is obtained in the wireless device. This implies that the path is installed or configured in the device, for example, by loading the path in an application handling the power determination.

According to some aspects, the wireless device receives S0c, from a network node, information defining at least one path. The obtaining then implies installing the received path. This may be implemented as a configuration sent to the wireless device 10 from a network node. Optionally, the wireless device 10 will also confirm S0d the successful reception of the configuration, see FIGS. 3 and 6. A configuration may correspond to one path or multiple paths, several buildings or one building or one part of a building or one building floor or one part of a building floor.

Figure 6:
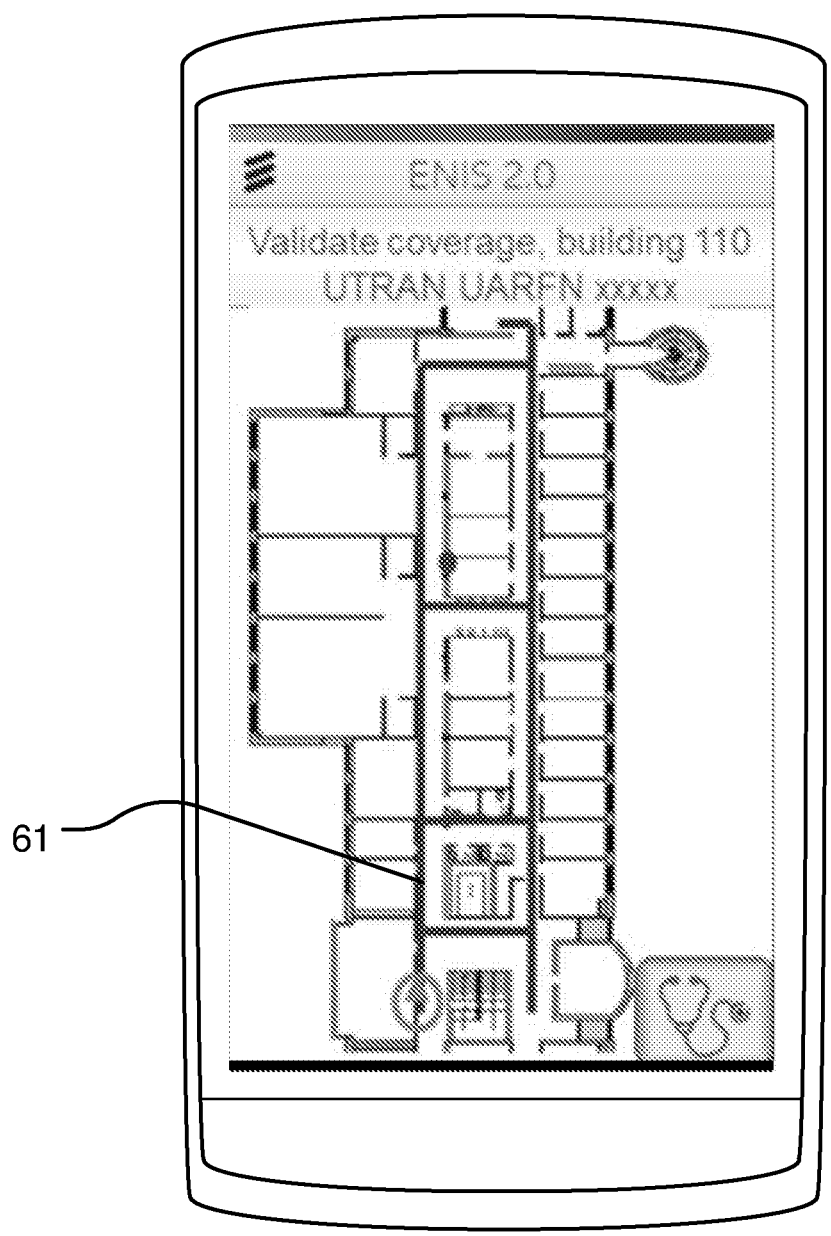
FIG. 6 shows an example of a path to be followed by the user and wireless device.

According to some aspects the method comprises providing S1b a graphical representation of the at least one path in the wireless device. This implies that the path 61 is shown on the screen, for example, on a map, as is illustrated in FIG. 6. Then the user is following the configured paths possibly supported by visualization in the wireless device 10 of the path and the current position along the path. Thereby, the user may gradually complete the path 61. The path 61 may be one-directional and has to be completed from start to end, or such that every part of the path needs to have been visited before the path is completed but in any order.

Alternatively, the considered positions for logging position estimates and/or radio condition measurements are not restricted to pre-configured or configurable paths. According to some aspects, the disclosure proposes a method, performed in a wireless device, of determining radio coverage. The method comprises receiving an indication to initiate determination of radio coverage, performing radio condition measurements and logging position estimates corresponding to the radio condition measurements. The method further comprises determining radio coverage using the radio condition measurements and corresponding position estimates and/or reporting the radio condition measurements and the corresponding position estimates to a radio network node for determination of radio coverage in the radio network node.

Radio Condition Measurements

Now turning back to FIG. 4. In the next step, the wireless device 10 performs S2 radio condition measurements along the path. Along implies within a predefined distance from the at least one path. The distance is defined as the distance between the current position of the wireless device and the closest point on the path. This covers also a "margin of error". This implies that measurements within a certain distance from the path are considered as being along the path. The wireless device 10 initiates radio condition measurements, wherein the measurements are either associated to a time value or a position estimate based on associated time values. According to some aspects, the indication received in step S0, also comprises information about radio frequency measurements. These measurements may be specified in terms of which Radio Access Technology, RAT that should be measured. For example, GSM EDGE Radio Access Network, GERAN, UMTS Terrestrial Ran Access Network, UTRAN, Universal Mobile Terrestrial System, Evolved UTRAN, Wi-Fi, Bluetooth can be examples of radio access technologies.

Radio condition measurements are, for example, Signal to interference Ratio, Radio Signal Strength, Radio Signal Quality, suitable coding and modulation scheme. The measurement may be Radio Signal Strength, RSS or radio signal quality, RSQ. Radio condition measurements are already performed in mobile phones in the control plane and in accordance with applicable standards. Hence, this step does not necessarily imply introducing any new measurements, but possibly implies fetching data that is already available in the control plane. This may be implemented in different ways. For example, by letting an application, using an application plane processor fetching measurement data from a control plane processor, when the wireless device is positioned along the path.

In the android operating system, an event or interrupt occurs when a new radio condition measurement value is available. Hence, one possible implementation would be to store the value once available, irrespective of the position of the wireless device. One would simply assume that the user moves along the configured path.

Another possibility is that the control plane generates new measurements at regular basis as e.g. in the IEEE 802.11 specification.

Another possibility would be to read the measurements from the control plane at regular intervals, or when the wireless device is positioned at certain positions.

According to some aspects, the measurements may be quantized and encoded to different representations. The measurement may also be translated into a corresponding bit rate. One example is a translation into a transport format, which corresponds to a coding (introducing redundancy to facilitate decoding) and modulation (determining how many bits that can be transferred in one symbol) scheme. In simple terms, a wireless device 10 may be asked to determine the transport format (modulation and coding scheme) that corresponds to a certain probability that the data is correctly decoded, or that the data needs to be resubmitted. In some systems, the MCS is reported to the wireless device 10 as a means to feedback radio conditions. Another example is channel rank, meaning to what extent the wireless device 10 observes opportunities to take advantages of multiple data streams in rich radio environments and facilitated by multiple antennas. A channel rank of two means that the wireless device 10 may receive two data streams, and more or less twice the data rate as with channel rank 1 and one data stream.

Position Estimation

In the next step, the wireless device 10 determines, S3, position estimates, wherein at least some of the position estimates correspond to the radio condition measurements.

According to some aspects, this implies that the wireless device 10 initiates position logging, wherein each position estimate is associated to a time value. The positions may, for example, be logged at regular intervals. It is then simply assumed that the user moves along the path.

According to some aspects, a first time value is associated to each radio condition measurement and a second time value is associated to each logged position estimate. Then each measurement may be correlated to a logged position estimate using the first and second time values. In one mode of the embodiment, the wireless device 10 will associate a first time value to each radio condition measurement in step S2. Based on the first time value, the wireless device 10 may associate the measurement to a position based on the position-time value tuples. One example is that the wireless device 10 selects the position that is associated to a second time value that is nearest in time to the first time value associated to the measurement. Another example is that the measurement is associated with a position that is interpolated between positions associated to time values immediately before and after the time value of the measurements, typically also considering the time values of the considered positions.

Another possibility is that each time a new radio condition measurement is retrieved e.g. because the operating system generates an event or interrupt indicating an updated measurement, then the wireless device determines the position of the device and stores the radio condition measurement together with the position estimate.

The position estimation is, for example, based on outdoor GNSS or by some other network-assisted mechanisms, or based on capabilities in the wireless device 10 for example to support indoor positioning. Such positioning may utilize radio frequency measurements and onboard sensors in the wireless device 10. U.S. Pat. No. 8,498,811 is one example of a method for positioning a user inside a building, where a user has a user carried device and the user carried device is provided with a direction sensor and a movement sensor.

According to some aspects, the obtained path is one input parameter to the position estimation, which may, for example, be used in combination with sensors.

According to some aspects, the user initiates the positioning along a path via a HID, Human Interface Device, action (like a start button, or a start menu item). According to other aspects, measurements are automatically initiated based on a vicinity determination that the wireless device 10 is close to the start of the current path, or any of the paths in the terminal as was discussed above for logging initiation.

According to some aspects, the user finalizes the positioning along a path via a HID action (like a "Done" button, or a "Done" menu item), or coverage determination is automatically terminated based on a vicinity determination that the wireless device 10 is close to the end of the current path.

In the next step, the wireless device 10 determines S4a radio coverage using the radio condition measurements and corresponding logged position estimates. Because the wireless device 10 has received a number of radio condition measurements that are each correlated to a corresponding position, it is now possible to create a map, wherein the radio condition in each measured position is known.

Figure 7:
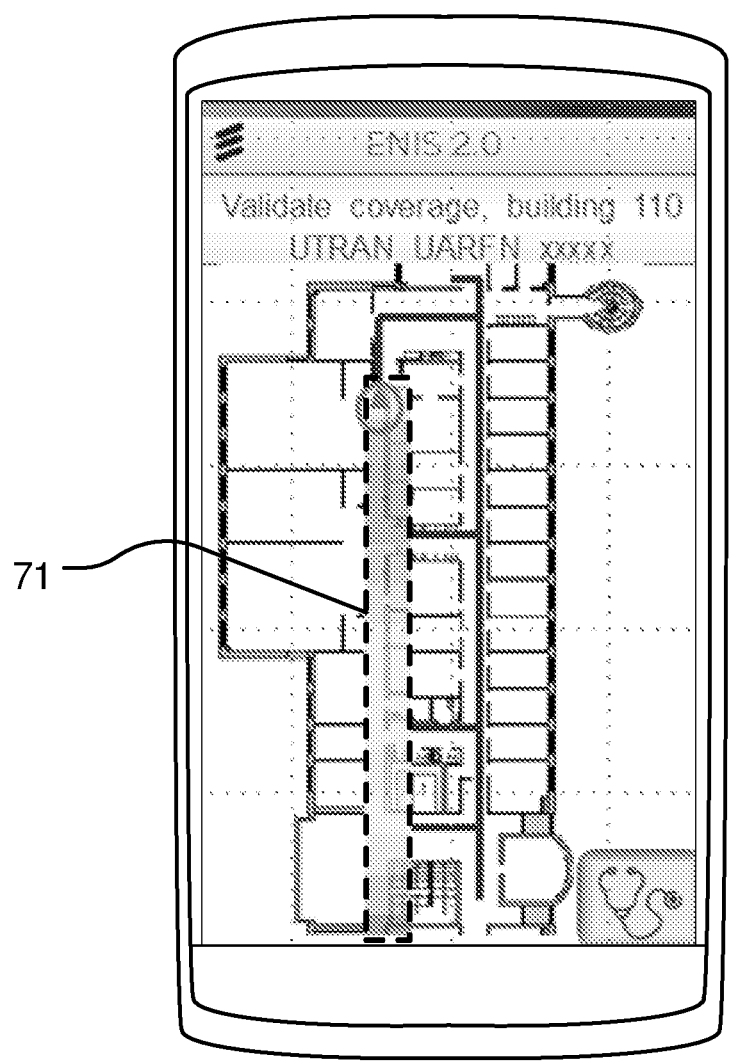
FIG. 7 shows an example of a measurement visualization while logging measurements associated to positions in the wireless device.

According to some aspects, the wireless device 10 provides a graphical representation of the determined coverage in the wireless device 10. This implies that the coverage is visualised in the wireless device. In this mode of the embodiment, the wireless device 10 optionally visualizes the measurement on the screen of the wireless device 10 at a point on the screen that is related to the position associated to the measurement. The measurement visualization indicates the measurement for example with a color from a color map where the color is related to a measurement value, and the color map is related to a value range. The visualization of the measurement can remain on the screen to indicate positions the wireless device 10 already have visited to support the user determining the extent to which the path is completed. The positioned measurement values are also stored in memory in the wireless device 10. FIG. 7 provides an example, where the coverage is visualized as different shades within a measured area 71.

According to some aspects, the wireless device 10 determines S6 suitable cell deployment using the determined coverage and at least one deployment criteria. According to some aspects, the deployment criteria comprise at least one of: an estimate of the inter-node distance, an estimate of the shortest distance to a window, a signal propagation model or dominance. In case the wireless device 10 has handled both measurements and positions, the wireless device 10 can be considered for automatic deployment planning. Based on the building maps, radio condition measurements and some pre-configured or configurable criterions, the wireless device 10 may be capable of determining a suitable deployment in the monitored area/building/part of building/building floor/part of building floor. In addition, it may be aware of parameters associated to the equipment considered for deployment, for example the transmission power of the considered node type.

Examples of such criterions include:
An estimate of the inter-node distance. For example, one node every 20 m.
An estimate of the shortest distance to a window.
A signal propagation model, for example, a signal power loss in dB per meter or per logarithm of the distance to the node in meters. The use of signal propagation models is discussed in more detail in connection with FIG. 11.
A dominance criterion, meaning that the deployed cells shall provide coverage in the considered area that is dominating over other nodes in the area, based on the measurements. Predicted signal levels are considered for the nodes to be deployed.

When the wireless device 10 has completed the planning, it may signal the proposed deployment to a network node for confirmation.

In case the measurement campaign is due to that a completed deployment in the considered area is to be validated, then the wireless device 10 may optionally validate the deployment with respect to some pre-configured or configurable criterion. Examples of such criterion are:
A signal propagation model, for example a signal power loss in dB per meter or per logarithm of the distance to the node in meters. The use of signal propagation models is discussed in more detail in connection with FIG. 11.
A dominance criterion, meaning that the deployed cells shall provide coverage in the considered area that is dominating over other nodes in the area, based on the measurements. Predicted signal levels are considered for the nodes to be deployed.

In case all measurements and positions are handled by the wireless device 10, the wireless device 10 may signal the positioned measurements to a network node, either in one batch, in regular batches, or once a new measurement is available in the wireless device 10.

In some example embodiments, the radio condition measurements are configured by the serving base station, as ordered by a different network node, and which in turn may have been ordered by yet another network node.

According to such aspects, the wireless device 10 reports S4b the radio condition measurements and the corresponding position estimates to a radio network node for determination of radio coverage in the radio network node.

Figure 5:
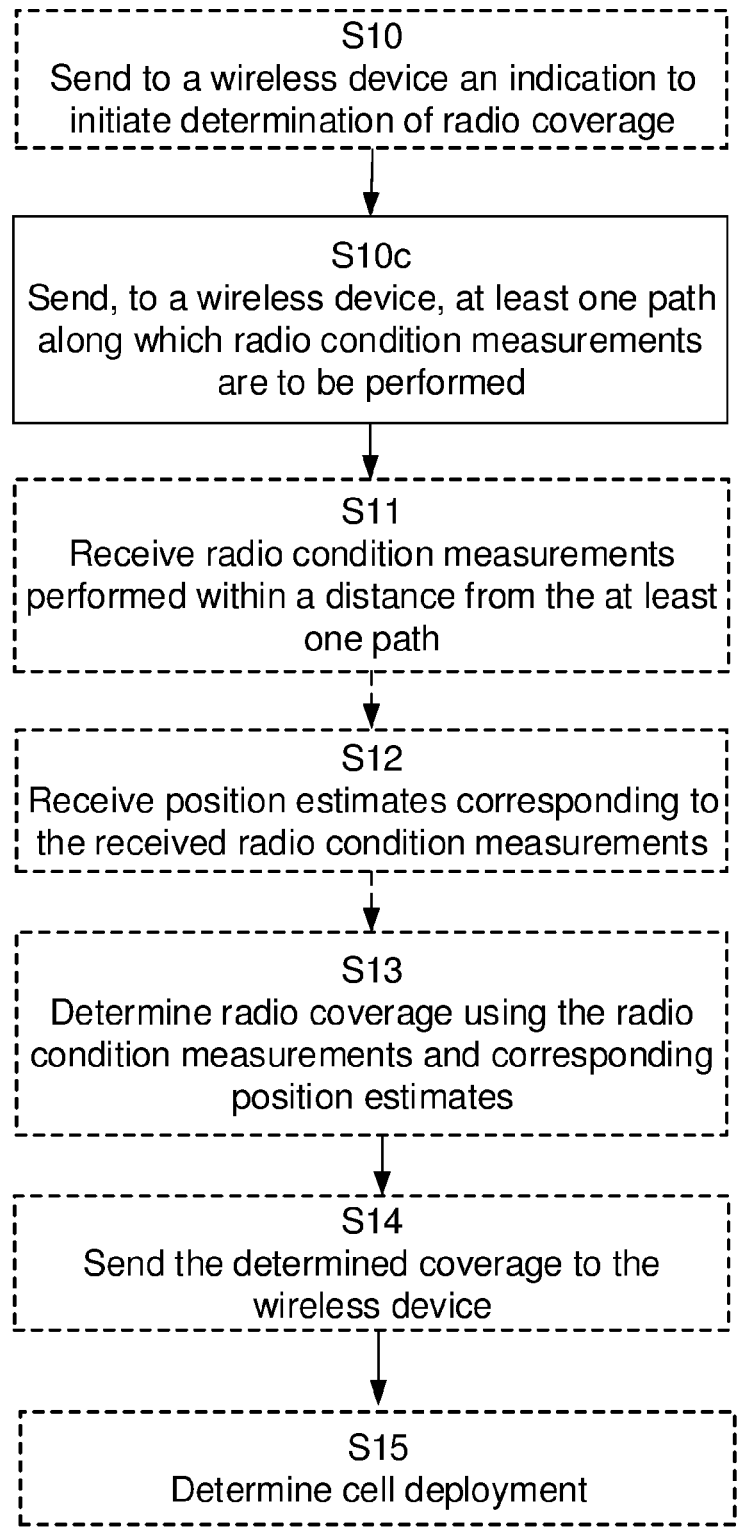
FIG. 5 is a flowchart schematically illustrating embodiments of method steps performed in a network node.

The corresponding method, performed in a network node in a wireless communications network, of determining radio coverage using at least one wireless device 10 being connected to the wireless communications network, will now be described referring to FIG. 5.

According to some aspects, the method comprises sending S10 to a wireless device 10 an indication to initiate determination of radio coverage. According to some aspects, the configuration received also comprises information about radio frequency measurements.

According to some aspects of the proposed technique, the network node sends S10c, to a wireless device 10, information defining at least one path along which radio condition measurements are to be performed as described in relation to the wireless device. The information is, for example, comprised in the indication S10 to initiate determination of radio coverage as shown in FIG. 3.

According to some aspects, the configuration may list which RATs and frequency carriers that the wireless devices 10 should consider.

According to some example embodiments, the measurement configuration is initiated in a network management node and sent to the Mobility Management Entity, MME. The measurement configuration may list which RATs and frequency carriers that the wireless devices 10 should consider. The configuration may also identify the wireless device 10, typically via its subscription identifier, International Mobile Subscription Identifier, IMSI.

The MME further signals a measurement configuration to the base station serving the wireless device 10. The base station configures the wireless device 10 with measurement configurations, typically periodic measurements of radio signal strength and radio signal quality. Such measurements are readily handled on the serving RAT and carrier, but for measurements on other carrier/RAT combinations, the base station may need to configure measurement gaps (idle periods when the wireless device can expect no scheduled data). The need for measurement gaps also depends on the wireless device 10 capability and whether the wireless device 10 is capable of simultaneously measuring on more than one carrier and/or RAT.

The wireless device 10 is further configured to, typically periodically but possibly also batch-wise, report the measurements to the serving base station. Either the wireless device 10 or the base station will tag the measurements with a time value.

The base station will forward the measurements to a network node, or a network management system node, or a database server in the management system. Hence, in the next step the network node receives S11 radio condition measurements. In the next step the network node receives S12 position estimates corresponding to the received radio condition measurements. According to some aspects, the radio condition measurements and the position estimates are received batch wise.

In the next step the network node determines S13 radio coverage using the radio condition measurements and corresponding position estimates. In one embodiment, the network node uses only the radio condition measurements associated to the paths, and analyses the coverage via statistical measures. Examples of such statistical measures can be the percentage of the positions corresponding to an area, a path, a building, building floor or building area etc. that are associated to a radio condition that is above a threshold the radio condition of a percentile of the radio conditions associated to an area, a path, a building, building floor or building area etc.

similar statistical measures but for the radio condition of the strongest network node compared to the combined radio condition of non-strongest network nodes. Examples of such comparison are the relative radio condition between the strongest and the second strongest network node signals, the relative radio condition between the strongest and the sum of the non-strongest, etc. Such measures are sometimes referred to as dominance or geometry or worst case signal to interference, etc.

The statistical measures can be used to assess whether the radio coverage is satisfactory or not, for example if the percentage of positions mentioned above is above a predetermined of configurable level, such as 95%, or if the percentile mentioned above is above a predetermined of configurable level, such as 140 dBm (signal strength radio condition) or 10 dB (signal quality radio condition or relative radio condition). Note that these figures only serve as examples.

In another embodiment, the radio condition measurements associated to paths are processed to predict radio conditions outside the paths using interpolation techniques. This operation gives additional data at positions not covered by the paths. Using the extended data, similar statistical measures as described above can be used to analyse the radio coverage.

Figure 10:
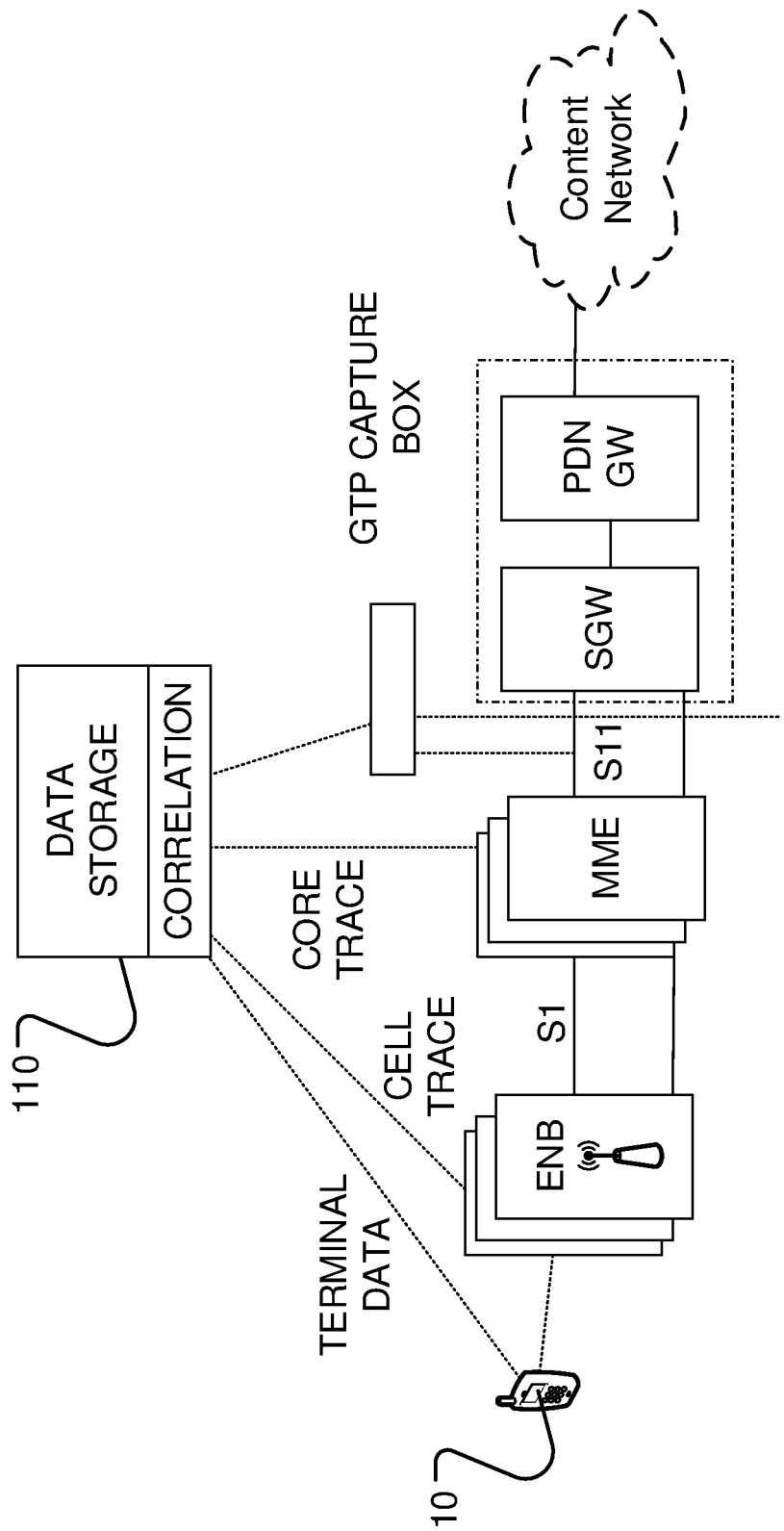
FIG. 10 illustrates an example of a Management System where the radio and core information and location data is processed.

FIG. 10 illustrates one architecture supporting the reporting, where the reporting from the base station to the management system is either via a cell trace or a UE (wireless device 10) trace. Furthermore, an enhanced view of the performance can be obtained via probes also in the core network nodes MME, Serving Gateway, SGW and Packet Data Network Gateway, PDN GW, through which the wireless device 10 control plane and user plane data flows. This means that in some embodiments, it is also possible to consider user plane measurements such as bit rates and latency to a time value, which may be correlated to a position in the management system.

According to some aspects, the network node sends S14 information about the determined radio coverage to the wireless device for providing a graphical representation of the determined coverage in the wireless device 10.

One advantage with determining coverage in the network, is that the wireless device 10 is more likely to be able to measure on more than one carrier and/or RAT at the time since the base station can initiate such measurements, while the operating system in the wireless device 10 may be unable to configure the wireless device 10 to perform all desired measurements simultaneously. Instead, in the wireless device implementation, the user may need to traverse the paths more than once to cover all configured carriers and RATs.

According to some aspects, the network node determines S15 suitable cell deployment using the determined coverage and at least one deployment criteria. According to one aspect, the deployment criteria comprise at least one of: an estimate of the inter-node distance, an estimate of the shortest distance to a window, a signal propagation model or a dominance criterion.

In case the network receives both measurements and positions, the network can be considered for automatic deployment planning. Based on the building maps, radio condition measurements and some pre-configured or configurable criterions, the wireless device 10 can be capable of determining a suitable deployment in the monitored area/building/part of building/building floor/part of building floor. In addition, it can be aware of parameters associated to the equipment considered for deployment, for example the transmission power of the considered node type.

Examples of such criterions have already been described in relation to the wireless device.

In case the measurement campaign is due to that a completed deployment in the considered area is to be validated, then the network may optionally validate the deployment with respect to some pre-configured or configurable criterion.

1. A signal propagation model, for example a signal power loss in dB per meter or per logarithm of the distance to the node in meters. The use of signal propagation models is discussed in more detail in connection with FIG. 11.
2. A dominance criterion, meaning that the deployed cells shall provide coverage in the considered area that is dominating over other nodes in the area, based on the measurements. Predicted signal levels are considered for the nodes to be deployed.

Figure 8:
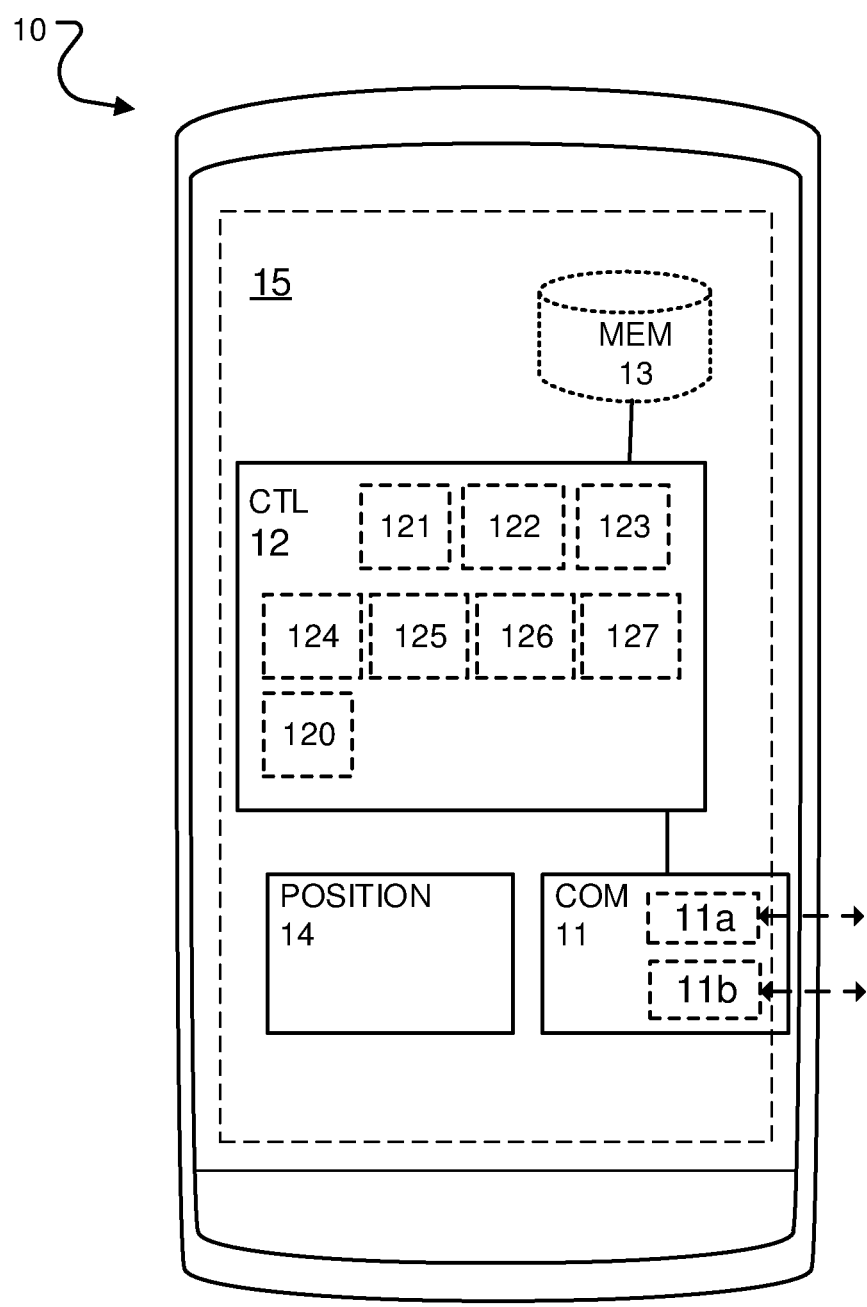
FIG. 8 is a block diagram schematically illustrating a wireless device, for performing the method steps.

Turning now to FIG. 8, a schematic diagram illustrating some circuitry and/or modules of an example embodiment of a wireless device 10 configured for determining radio coverage, will be described. In this application a wireless device 10 or wireless device 10 is any wireless device able to wirelessly connect to a wireless network. The wireless device 10 is typically a smartphone or an M2M device.

The wireless device 10 comprises a controller, CTL, or a processing circuitry 12 that may be constituted by any suitable Central Processing Unit, CPU, microcontroller, Digital Signal Processor, DSP, etc., capable of executing computer program code. The computer program may be stored in a memory, MEM 13. The memory 13 can be any combination of a Random Access Memory, RAM, and a Read Only Memory, ROM. The memory 13 may also comprise persistent storage, which, for example, can be any single one or combination of magnetic memory, optical memory, or solid state memory or even remotely mounted memory.

The wireless device 10 further comprises a radio communication interface (i/f), COM 11. The radio communication interface 11 is arranged for wireless communication with access points or wireless devices within range of the wireless device 10. If several technologies are supported, the node typically comprises several radio communication interfaces, for example, one LTE interface 11a and 5G communication interface 11b. The radio communication interfaces 11a, 11b, are, for example, adapted to communicate with access nodes 20, 21, 22. The wireless device 10 is thereby configured to communicate with the network node 110 over a cellular network. The radio communication interface is further configured performing radio condition measurements.

The wireless device 10 further comprises a position estimation circuitry 14 configured for estimating the position estimates corresponding of the wireless device. The wireless device typically also comprises a display 15 and input means e.g. a touch screen for human interaction.

According to some aspects, the disclosure further relates to the above mentioned computer program, comprising computer readable code which, when run on a wireless device 10, causes the node to perform any of the aspects of the method described above.

When the computer readable code is run in the processing circuitry 11 of the wireless device 10, it causes the wireless device 10 to determine position estimates corresponding to the radio condition measurements.

According to one aspect, the wireless device is further caused to obtain at least one path along which radio condition measurements are to be performed. Then, the radio condition measurements are performed along the at least one path.

The wireless device 10 is further caused to determine radio coverage using the radio condition measurements and corresponding position estimates. Alternatively the wireless device is caused to report the radio condition measurements and the corresponding position estimates to a radio network node for determination of radio coverage in the radio network node.

According to one aspect, wireless is further caused to receive, using the radio communication interface, an indication to initiate determination of radio coverage and to perform radio condition measurements using the radio communication interface.

According to one aspect of the disclosure the processing circuitry 12 comprises one or several of:
- a receiver module 120 configured to receive an indication to initiate determination of radio coverage,
- an obtainer module 121 configured to obtain at least one path along which radio condition measurements are to be performed,
- a measurement module 122 configured to receive perform radio condition measurements,
- a position determination module 123 configured to receive position estimates corresponding to the radio condition measurements, and
- a determiner 124 configured to receive determine S4a radio coverage using the radio condition measurements and corresponding position estimates and/or
- a report module 125 configured to receive reporting S4b the radio condition measurements and the corresponding position estimates to a radio network node for determination of radio coverage in the radio network node.

According to some aspects, the disclosure the processing circuitry 12 further comprises a second visualization module 126 configured to provide a graphical representation of the determined coverage in the wireless device 10.

According to some aspects, the disclosure the processing circuitry 12 further comprises a deployment module 127 configured to determine S6 suitable cell deployment using the determined coverage and at least one deployment criteria.

The modules 120-127, are implemented in hardware or in software or in a combination thereof. The modules 120-127, are according to some aspects implemented as a computer program stored in a memory 13 which run on the processing circuitry 12. The wireless device 10 is further configured to implement all the aspects of the disclosure as described in relation to the methods above. The processing circuitry 12 also comprises the corresponding modules.

Figure 9:
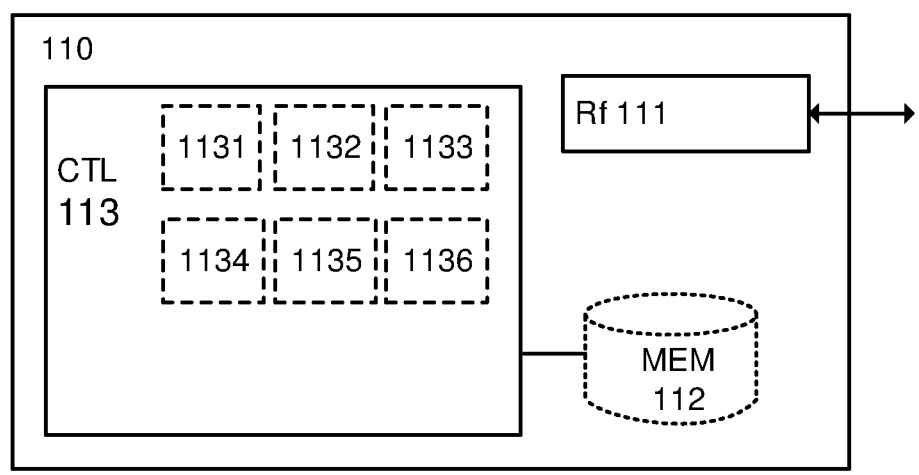
FIG. 9 is a block diagram schematically illustrating a network node, for performing the method steps.

Turning now to FIG. 9, a schematic diagram illustrating some modules of an example embodiment of a network node 110 in the network management system assisted by a wireless device 10, will be described.

The network node 110 comprises a controller, CTL, or a processing circuitry 113 that may be constituted by any suitable Central Processing Unit, CPU, microcontroller, Digital Signal Processor, DSP, etc., capable of executing computer program code. The computer program may be stored in a memory, MEM 112. The memory 112 can be any combination of a Random Access Memory, RAM, and a Read Only Memory, ROM. The memory 112 may also comprise persistent storage, which, for example, can be any single one or combination of magnetic memory, optical memory, or solid state memory or even remotely mounted memory.

The network node 110 further comprises a communication interface 111 configured to communicate with other nodes in the cellular network.

According to some aspects, the disclosure further relates to the above mentioned computer program, comprising computer readable code which, when run on a radio network module, causes the network node to perform any of the aspects of the method described above.

When the above-mentioned computer program code is run in the processing circuitry 12 of the network node 110, it causes the network node 110 to receive S11 radio condition measurements, receive S12 position estimates corresponding to the received radio condition measurements, and determine S13 radio coverage using the radio condition measurements and corresponding position estimates.

According to one aspect, the network node is caused to send, to a wireless device, at least one path along which radio condition measurements are to be performed.

According to some aspects, the disclosure further relates to the above mentioned computer program, comprising computer readable code which, when run on a network node, causes the network node to perform any of the aspects of the method described above.

According to some aspects, of the disclosure the controller comprises one or several of:
 a first receiver module 1131 configured to receive radio condition measurements,
 a second receiver module 1132 configured to 1132 position estimates corresponding to the received radio condition measurements, and
 a determination module 1133 configured to determining 1133 radio coverage using the radio condition measurements and corresponding position estimates.

According to some aspects, the network node 110 is further adapted to send to a wireless device 10 an indication to initiate determination of radio coverage. According to one aspect, the network node is configured to send, to a wireless device, at least one path along which radio condition measurements are to be performed. According to one aspect the controller 113 comprises a sender module 1134 configured for this purpose.

According to some aspects the network node 110 is further adapted to provide a graphical representation of the determined coverage in the wireless device 10. According to some aspects the controller 113 comprises a visualization module 1135 configured for this purpose.

According to some aspects the network node 110 is further adapted to determine suitable cell deployment using the determined coverage and at least one deployment criteria. According to one aspect the controller 113 comprises a visualisation module 1136 configured for this purpose.

The modules 1131 to 1136 are implemented in hardware or in software or in a combination thereof. The modules 1131 to 1136 are according to one aspect implemented as a computer program stored in the memory 112 which run on the processing circuitry 113. The network node 110 is further configured to implement all the aspects of the disclosure as described in relation to the methods above.

Figure 11:
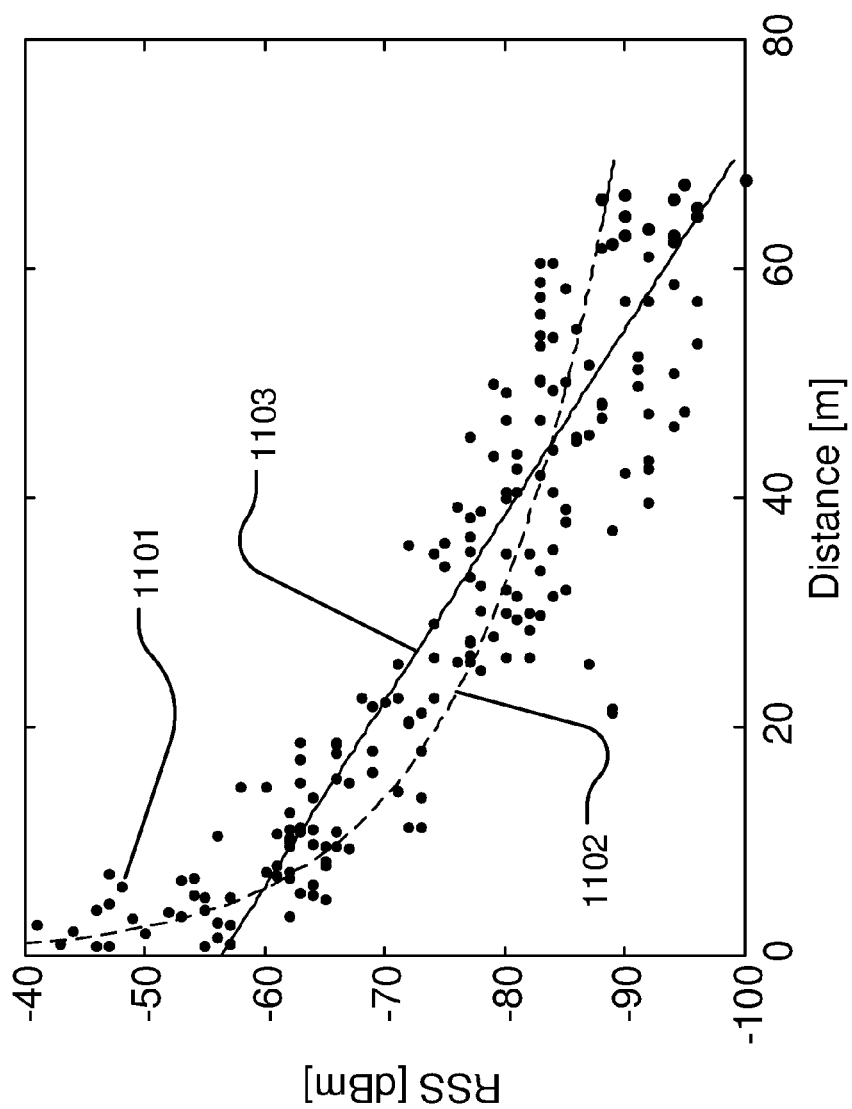
FIG. 11 illustrates examples of signal propagation models and signal strength measurements, where the propagation model parameters optionally are estimated based on the signal strength measurements.

FIG. 11 illustrates some aspects of signal propagation models that optionally may be considered in different embodiments of the disclosure. The figure visualizes 1101 signal measurements with respect to a radio node versus the distance between the position at which the measurement was obtained to the position of the radio node. The signal propagation may be associated to a propagation model, either with pre-configured or configurable parameters, or parameters that are estimated based on measurements. Two typical model structures include:
 a radio signal strength P that decreases linearly with distance d:

$$P(d)=C1+C2*d,$$

where C1 and C2 are parameters, see curve 1103, and
 a radio signal strength P that decreases linearly with the logarithmic distance $\log_{10}(d)$ $$P(d)=C3+C4*d,$$

where C3 and C4 are parameters, see curve 1102.

The model selection and the parameter values may be pre-configured or configurable by the network node, but the parameters can also be estimated based on measurements by either the terminal or the network node. Since these models are linear, the parameters can be estimated via linear regression.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as wireless device should be considered as non-limiting. A wireless device, wireless terminal or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed example aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method, performed in a wireless device, of determining radio coverage for at least one small cell base station, the method comprising:
    obtaining at least one path in an indoor environment, along which radio condition measurements are to be performed, wherein the at least one path is obtained at least based on reception of information defining the at least one path from a radio network node;
    performing radio condition measurements along the at least one path;
    determining position estimates along the at least one path within a predefined distance from the at least one path using location data, wherein at least some of the position estimates correspond to the radio condition measurements, wherein the location data is obtained from a direction sensor and a movement sensor of the wireless device; and
    either determining radio coverage using the radio condition measurements and corresponding position estimates, or reporting the radio condition measurements and the corresponding position estimates to the radio network node for determination of radio coverage in the radio network node, wherein the wireless device determines the radio coverage upon reception of an indication from the network node to initiate determination of the radio coverage.

2. The method of determining radio coverage of claim 1, further comprising providing a graphical representation of the path in the wireless device.

3. The method of determining radio coverage of claim 1, further comprising determining suitable cell deployment using the determined coverage and at least one deployment criteria.

4. The method of determining radio coverage of claim 3, wherein the deployment criteria comprises at least one of: an estimate of an inter-node distance; an estimate of a shortest distance to a window; a signal propagation model; and a dominance criterion.

5. The method of determining radio coverage of claim 1, wherein the position estimates are determined by utilizing the at least one predefined path.

6. The method of determining radio coverage of claim 1, further comprising providing a graphical representation of the determined coverage.

7. The method of determining radio coverage of claim 1, wherein the radio condition measurements comprises at least one of: Signal to Interference Ratio; Radio Signal Strength; Radio Signal Quality; coding and modulation scheme.

8. The method of determining radio coverage of claim 1, wherein the indication to initiate determination is triggered by a Human Interface Device action in the wireless device.

9. The method of claim 1, wherein each radio condition measurement along the at least one path is associated with a time value and each position estimate is associated with a time value; and
    wherein said determining the radio coverage includes correlating each position estimate to one of the radio condition measurements that has a time value that is closest to a time value of that position estimate; or wherein said reporting the radio condition measurements and the corresponding position estimates includes reporting their time values so that the radio network node is enabled to correlate each position estimate to one of the radio condition measurements that has a time value that is closest to a time value of that position estimate.

10. The method of claim 1, wherein each radio condition measurement along the at least one path is associated with a time value and each position estimate is associated with a time value; and
    wherein said determining the radio coverage includes interpolating between position estimates that are associated with time values that are immediately before and immediately after the time value of the corresponding radio condition measurement; or wherein said reporting the radio condition measurements and the corresponding position estimates includes reporting their time values so that the radio network node is enabled to interpolate between position estimates that are associated with time values that are immediately before and immediately after the time value of the corresponding radio condition measurement.

11. The method of claim 1, wherein the location data is associated with a satellite positioning system or a network assisted positioning system.

12. A wireless device configured to determine radio coverage, the wireless device comprising:

a radio communication interface configured to communicate with a radio network node;
position estimation circuitry configured to estimate position estimates of the wireless device;
processing circuitry; and
memory comprising instructions executable by the processing circuitry whereby the wireless device is operative to:
   obtain at least one path, in an indoor environment, along which radio condition measurements are to be performed, wherein the at least one path is obtained at least based on reception of information defining the at least one path from the network node;
   perform, using the radio communication interface, radio condition measurements along the at least one path;
   determine, using the position estimation circuitry, position estimates along the at least one path within a predefined distance from the at least one path using location data, wherein at least some of the position estimates correspond to the radio condition measurements; wherein the location data is obtained from a direction sensor and a movement sensor of the wireless device; and
   either determine radio coverage using the radio condition measurements and corresponding position estimates, or report, using the radio communication interface, the radio condition measurements and the corresponding position estimates to the radio network node for determination of radio coverage in the radio network node, wherein the wireless device determines the radio coverage upon reception of an indication from the network node to initiate determination of the radio coverage.

13. The wireless device of claim 12, wherein the instructions are such the wireless device is operative to determine suitable cell deployment using the determined coverage and at least one deployment criteria.

14. The wireless device of claim 12, wherein the instructions are such the wireless device is operative to determine position estimates utilizing the at least one predefined path.

15. The wireless device of claim 12, wherein the instructions are such the wireless device is operative to provide a graphical representation of the path in the wireless device.

16. A network node comprising:
   a communication interface configured for communication with the wireless device;
   a processing circuitry; and
   a memory comprising instructions executable by the processing circuitry whereby the network node is operative to:
      send the wireless device information defining at least one path in an indoor environment, along which radio condition measurements are to be performed so that the wireless device is enabled to determine position estimates along that path using location data, wherein the location data is obtained from a direction sensor and a movement sensor of the wireless device, wherein at least some of the position estimates correspond to the radio condition measurements.

17. The network node of claim 16, wherein the instructions are such the network node is operative to:
   receive radio condition measurements from the wireless device; and determine radio coverage using the radio condition measurements and corresponding position estimates.

18. The network node of claim 17, wherein the instructions are such the network node is operative to determine suitable cell deployment using the determined coverage and at least one deployment criteria.

* * * * *